(12) United States Patent
Mandal et al.

(10) Patent No.: US 12,363,054 B1
(45) Date of Patent: Jul. 15, 2025

(54) SYSTEMS AND METHODS FOR ENHANCING VECTOR SEARCHES FOR QUESTION-AND-ANSWER PLATFORMS

(71) Applicant: INTUIT INC., Mountain View, CA (US)

(72) Inventors: Sumangal Mandal, Bangalore (IN); Vaishali Gupta, Bangalore (IN)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 18/400,851

(22) Filed: Dec. 29, 2023

(51) Int. Cl.
*H04L 51/02* (2022.01)
*G06F 16/9032* (2019.01)
*G06F 40/20* (2020.01)

(52) U.S. Cl.
CPC ........ *H04L 51/02* (2013.01); *G06F 16/90332* (2019.01); *G06F 40/20* (2020.01)

(58) Field of Classification Search
CPC .......... G06F 16/9032; G06F 16/90332; G06F 16/90335; G06F 16/90344; G06F 16/90348; G06F 40/20; G06F 40/30; H04L 51/02
See application file for complete search history.

(56) References Cited

U.S. PATENT DOCUMENTS

| | | | | |
|---|---|---|---|---|
| 10,762,438 | B1* | 9/2020 | Zhang | G06N 20/00 |
| 2018/0341871 | A1* | 11/2018 | Maitra | G06N 3/042 |
| 2019/0163500 | A1* | 5/2019 | Daianu | H04L 67/306 |
| 2020/0327196 | A1* | 10/2020 | Sampat | G06N 20/00 |
| 2022/0138433 | A1* | 5/2022 | Divakaran | G06N 3/045 704/9 |
| 2022/0391750 | A1* | 12/2022 | Fagan | G06N 5/04 |
| 2023/0297887 | A1* | 9/2023 | Gurgu | G06N 20/00 706/12 |
| 2024/0249318 | A1* | 7/2024 | Spiegel | H04L 51/02 |
| 2024/0267344 | A1* | 8/2024 | Mulligan | H04L 51/214 |
| 2024/0311407 | A1* | 9/2024 | Barron | G06F 16/3344 |
| 2024/0422399 | A1* | 12/2024 | Chiu | H04N 21/47217 |
| 2025/0117595 | A1* | 4/2025 | Taheri | G06F 40/40 |
| 2025/0117596 | A1* | 4/2025 | Taheri | G06N 20/00 |
| 2025/0117814 | A1* | 4/2025 | Bennett | G06Q 30/0627 |
| 2025/0139383 | A1* | 5/2025 | Singh | G06F 16/3331 |

OTHER PUBLICATIONS

Difference between AL, ML, LLM, and Generative AI, Toloka Team, Aug. 2023. https://toloka.ai/blog/difference-between-ai-ml-llm-and-generative-ai/ (Year: 2023).*

* cited by examiner

*Primary Examiner* — Kostas J Katsikis
(74) *Attorney, Agent, or Firm* — DLA PIPER LLP US

(57) ABSTRACT

Systems and methods are provided for enhancing vector searches for question-and-answer platforms.

20 Claims, 4 Drawing Sheets

SYSTEMS AND METHODS FOR ENHANCING VECTOR SEARCHES FOR QUESTION-AND-ANSWER PLATFORMS

BACKGROUND OF THE DISCLOSURE

Question-and-answer ("QnA") platforms can be vital sources of information for users seeking answers to various topics. When users need assistance with a service (e.g., banking, accounting, taxes, shopping, etc.), they frequently will interact with a QnA chatbot, which enables the users to ask questions without having to talk to a human over the telephone. Moreover, the QnA chatbot assists the service providers because they do not need to employ a person to answer these questions. Generally, the effectiveness of QnA platforms depends on the quality of search algorithms that are used to retrieve relevant information to answer the users' questions. For example, a common search technique involves vector search algorithms to perform similarity searches based on a user query.

A shortcoming of using vector search algorithms for answering user questions in QnA systems arises in situations where users ask questions that are not directly like those that have already been asked on the platform. In other words, a limitation of vector search algorithms is that they can struggle to find similar questions that are not directly asked in the original post or query. This is undesirable. Often, the search accuracy can depend on the quality of the vector embeddings in the underlying vector database used to represent text data.

The drawings are not necessarily to scale, or inclusive of all elements of a system, emphasis instead generally being placed upon illustrating the concepts, structures, and techniques sought to be protected herein.

DESCRIPTION

The following detailed description is merely exemplary in nature and is not intended to limit the claimed invention or the applications of its use.

Many vector databases used as the underlying knowledge base for a QnA platform include vectorized/embedded question and answer pairs ("QnA pairs"), but this can often lead to inaccurate results for questions that are different than what is in the underlying knowledge base, which is undesirable.

Embodiments of the present disclosure relate to systems and methods for enhancing vector searches for QnA platforms. The disclosed techniques can use generative artificial intelligence, such as various large language models (LLM), to generate additional QnA pairs from an underlying dataset of QnA pairs. For example, the disclosed system may use, as its underlying vectorized database of information, QnA pairs from various online question and answer platforms, such as Stack Overflow, GitHub, Quora, Reddit®, etc. The disclosed system can feed each QnA pair to an LLM and prompt the LLM to generate additional but related QnA pairs. Then, the original QnA pairs and the generated QnA pairs can be embedded to a vector space. This resulting vector space can be searched via vector search algorithms to answer user queries as they come in e.g., via a chatbot.

Figure 1:
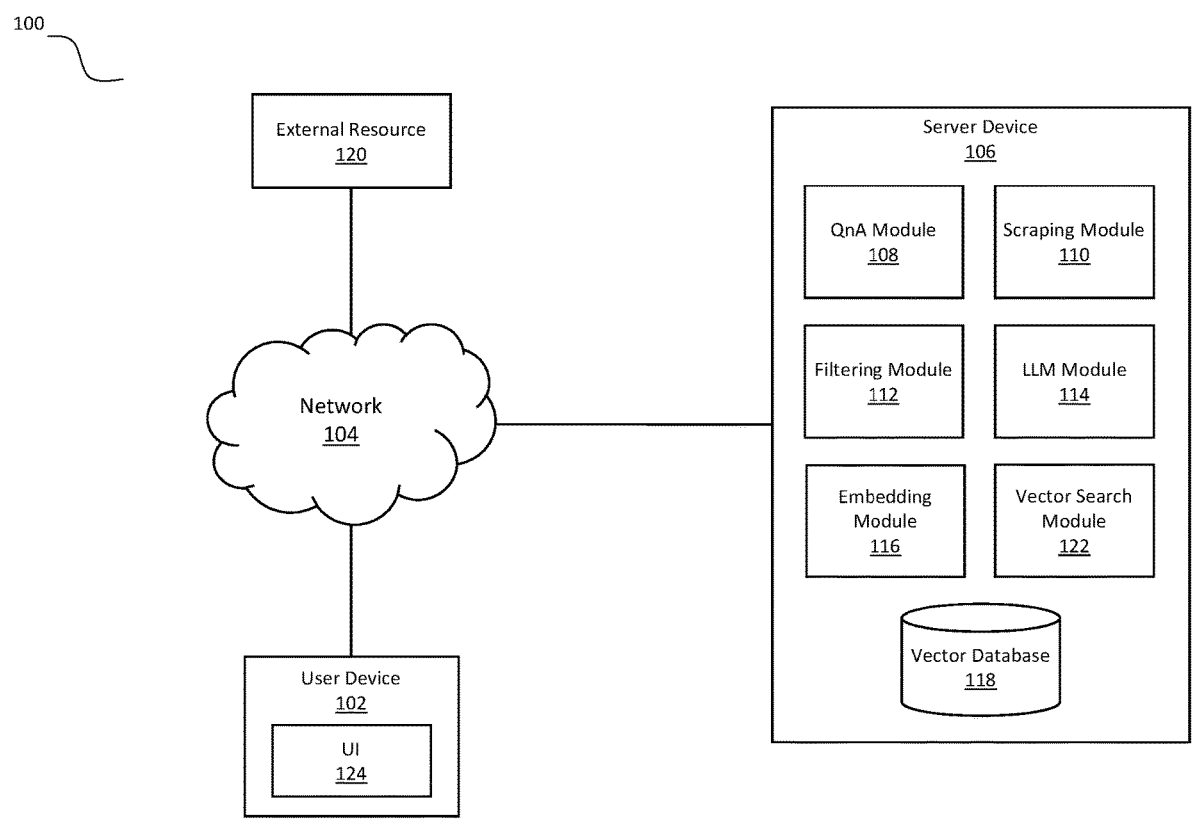
FIG. 1 is a block diagram of an example system for enhancing vector searches for QnA platforms according to example embodiments of the present disclosure.

FIG. 1 is a block diagram of an example system 100 for enhancing vector searches for QnA platforms according to example embodiments of the present disclosure. The system can include one or more user devices 102 (generally referred to herein as a "user device 102" or collectively referred to herein as "user devices 102") that can access, via network 104, a QnA module 108 residing on a server device 106. This communication link enables a user operating the user device 102 to interact with, via a user interface (UI) 124, a chatbot of the QnA module 108 such that he/she can ask questions that will automatically be answered. For example, the chatbot could be a part of various online services, such as banking, taxes, shopping, and others. In some embodiments, the system 100 can include any number of user devices 102. For example, for a financial or accounting platform or other website that may offer services to users, there may be an extensive userbase with thousands or even millions of users that connect to the system 100 via their respective user device 102.

A user device 102 can include one or more computing devices capable of receiving user input, transmitting and/or receiving data via the network 104, and or communicating with the server 106. In some embodiments, a user device 102 can be a conventional computer system, such as a desktop or laptop computer. Alternatively, a user device 102 can be a device having computer functionality, such as a personal digital assistant (PDA), a mobile telephone, a smartphone, tablet, or other suitable device. In some embodiments, a user device 102 can be the same as or similar to the computing device 400 described below with respect to FIG. 4.

The network 104 can include one or more wide areas networks (WANs), metropolitan area networks (MANs), local area networks (LANs), personal area networks (PANs), or any combination of these networks. The network 104 can include a combination of one or more types of networks, such as Internet, intranet, Ethernet, twisted-pair, coaxial cable, fiber optic, cellular, satellite, IEEE 801.11, terrestrial, and/or other types of wired or wireless networks. The network 104 can also use standard communication technologies and/or protocols.

The server 106 may include any combination of one or more of web servers, mainframe computers, general-purpose computers, personal computers, or other types of computing devices. The server 106 may represent distributed servers that are remotely located and communicate over a communications network, or over a dedicated network such as a local area network (LAN). The server 106 may also include one or more back-end servers for carrying out one or more aspects of the present disclosure. In some embodiments, the server 106 may be the same as or similar to server 300 described below in the context of FIG. 3.

As shown in FIG. 1, the server 106 can include a QnA module 108, a scraping module 110, a filtering module 112, an LLM module 114, an embedding module 116, a vector database 118, and a vector search module 122. In addition, the server 106 can be connected via network 104 to one or more external resources 120, which can include various discussion or question and answer platforms, such as Stack Overflow, GitHub, Quora, Reddit®, etc.

In some embodiments, the QnA module 108 is configured to execute a chatbot platform that a user can interact with via user device 102. In some embodiments, when a chatbot interface is executing, a chat interface is displayed on the user device 102 via the UI 124, enabling the user to interact with the QnA module 108. The QnA module 108 can receive a query entered into and submitted through the chatbot interface, which is transmitted to the QnA module 108 via the network 104. In addition, the QnA module 108 can be configured to transmit responses/answers generated in response to the user query back to the user device 102 for display in the chatbot interface via UI 124.

In some embodiments, the scraping module 110 is configured to access the external resources 120 and scrape posts therefrom. For example, the scraping module 110 can access Stack Overflow and scrap a post, which can include a question and one or more answering posts. In some embodiments, the scraping module 110 is configured to ignore posts from the external resources 120.

In some embodiments, the filtering module 112 can apply one or more filters to the posts scraped from the external resources 120 by the scraping module 110. For example, because LLM models typically include a token size limitation, the filtering module 112 can utilize a character limitation related to the token size limitation of the LLM module that is being used by the LLM module 114. For example, in some embodiments, the filtering module 112 can filter out any posts that are longer than a predefined character limit, such as 5,000 characters. However, this is merely exemplary in nature and the filtering module 112 can filter posts based on a variety of criteria, such as e.g., different character lengths, word lengths, author identity, subject matter, to name a few.

In some embodiments, the LLM module 114 includes an LLM, such as GPT-3, -3.5, -4, PaLM, Ernie Bot, LLaMa, and others. In some embodiments, an LLM can include various transformed-based models trained on vast corpuses of data that utilize an underlying neural network. The LLM module 114 can receive an input, such as a post scraped from the external resources 120. The LLM module 114 is configured to analyze the input and generate one or more additional QnA pairs that can be either similar or dissimilar to the input. In some embodiments, the additional QnA pairs may be smaller than the original input.

In some embodiments, the embedding module 116 is configured to embed text to vector form within a vector space, such as a continuous vector space. The embedding module 116 can receive text from the QnA module 108 (such as a user inquiry from the user device 102 within the chatbot platform) or the scraping module 110 (such as question and answer posts from a question-and-answer platform) and generate an embedding of the received text. In some embodiments, the embedding module 116 can utilize a variety of embedding techniques, such as e.g., a word2vec model. The word2vec model may be pre-trained. In some embodiments, the word2vec model may use a continuous bag-of-words approach (CBOW). The word2vec model may be configured to create a "bag-of-words" for each description. A bag-of-words for a description may be a set (e.g., JSON object) that includes every word in the user inquiry and the multiplicity (e.g., the number of times the word appears in the description) of each word. The word2vec model can be configured to predict a vector representation of each word using the context of the word's usage in the inquiry. For example, the word2vec model may consider the surrounding words and the multiplicities but may not use grammar or the order of the words in the description. In some embodiments, the embedding module 116 may include an encoder and/or a neural network architecture to perform the embedding processes.

In some embodiments, the embedding module 116 may use a word2vec model with a skip-gram approach, where a skip-gram approach predicts a focus word within a phrase or sentence. The pre-trained word vectors may be initially trained on a variety of sources, such as e.g., Google News and Wikipedia. In some embodiments, the embedding module 116 may employ other words embedding frameworks such as GloVe (Global Vector) or FastText. GloVe techniques may embed words such that the dot product of two-word vectors is close to or equal to the log of the number of times appear near each other. This is different than predicting neighboring words (CBOW) or predicting the focus word (skip-gram).

In addition, it is important to note that the disclosed embedding techniques are not limiting and that a variety of other applicable embedding techniques that are known by those of ordinary skill in the art could be used.

In some embodiments, the vector database 118 is configured to store the text that has been embedded by the embedding module 116. For example, the vector database 118 can store the QnA pairs obtained from the various external resources 120 and embedded by the embedding module 116. In addition, the vector database 118 can store the QnA pairs generated by the LLM module 114 that have been embedded by the embedding module 116. This enables the vector search module 122 to apply an embedded user query to both sets of embedded data.

In some embodiments, the vector database 118 is a vector store that can be fine-tuned for efficient data retrieval and management. One such example is a Chroma Database. In some embodiments, the embedded repository 128 can employ one or more of indexing and querying techniques that can be used for hierarchical clustering or partitioning. The use of such indexing and querying techniques can enable parallel processing, caching, and prefetching, which can minimize latency to store frequently accessed data in memory. Moreover, this can provide data compression and efficient storage without sacrificing query performance with fault tolerance and recovery.

In some embodiments, the vector search module 122 is configured to perform a variety of vector search and/or similarity techniques and algorithms within the vector database 118. For example, the vector search module 122 can receive an embedded user query from the QnA module 108 and apply a similarity technique on the embedded user query within the vector database 118 to identify a similar question and therefore an applicable answer. In some embodiments, the vector search module 122 can use a combination of cosine similarity and machine learning-based ranking within the vector store. In addition, the vector search module 122 can use various other vector search techniques, such as Euclidean distance, Manhattan distance, and Jaccard similarity. The vector search module 122 can also use various machine learning algorithms, such as support vector machines, random forests, and neural networks, to rank the vectors in the vector store.

Figure 2:
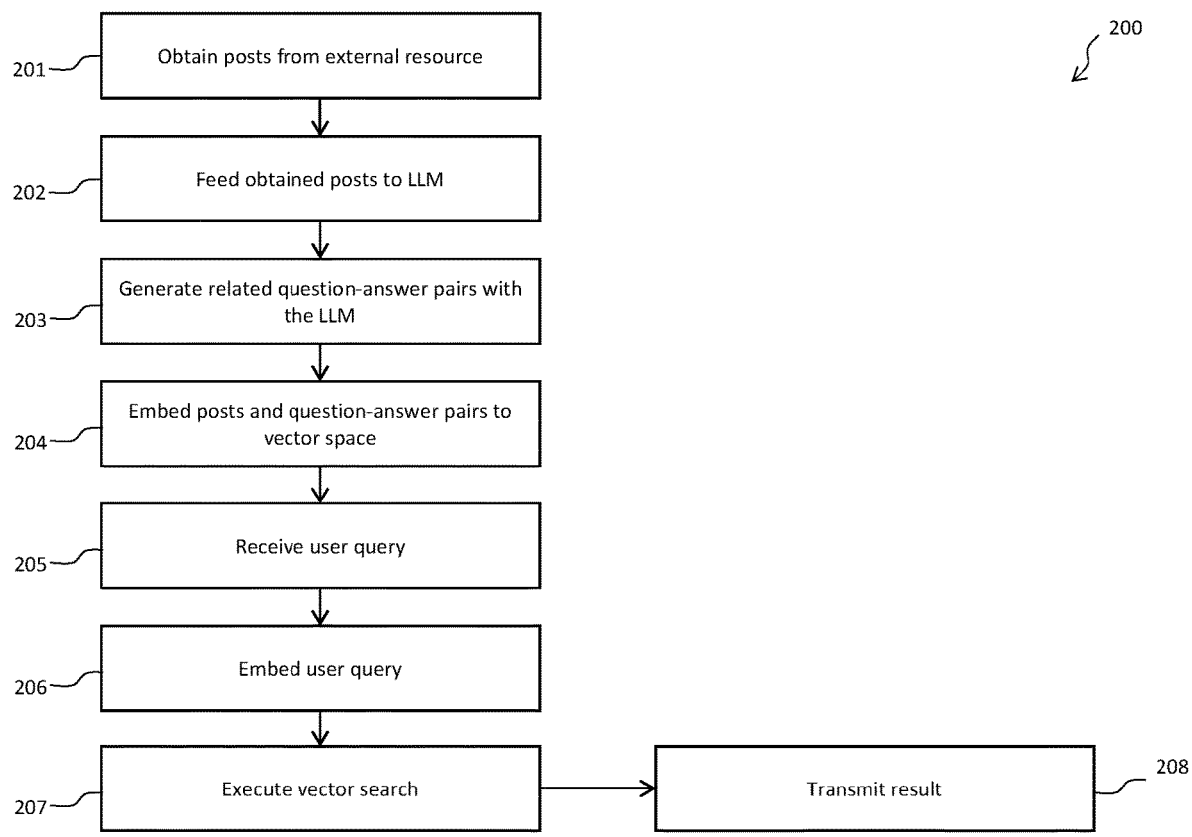
FIG. 2 is a flowchart of an example process for enhancing vector searches for QnA platforms according to example embodiments of the present disclosure.

FIG. 2 is a flowchart of an example process 200 for enhancing vector searches for QnA platforms according to example embodiments of the present disclosure. In some embodiments, process 200 can be performed by the server 106 in conjunction with an ongoing communication between a user device 102 and a chatbot platform of the QnA module 108. For example, a user may have a chatbot interface executing on the user device 102 via UI 124 where he/she will type a question in the chatbot interface.

At block 201, the scraping module 110 obtains posts from one or more of the external resources 120. In some embodiments, obtaining posts from an external resource 120 can include scraping the posts from the external resource 120. For example, the scraping module 110 can scrape various question and answer posts from the external resources 120, which may include various platforms such as Stack Overflow, GitHub, Quora, Reddit®, Yahoo® Answers, etc. In some embodiments, obtaining posts from the one or more external resources 120 can include applying one or more filters to the posts. For example, in some embodiments, the filtering module 112 can filter out any posts that are longer than a predefined character limit, which can be, for example, 5,000 characters. However, this is merely exemplary in nature and the filtering module 112 can filter posts based on a variety of criteria, such as different character lengths, word lengths, author identity, subject matter, etc.

An example post can be as follows: "QUESTION: Guidance on data transfer from Ebus to S3 I have couple of questions . . . Could you please provide guidance/share documentation on this? When the data is sent to Datalake (S3) from kafka topic, is there a pattern to allow for 100s of real-time queries by microservices? Is there a pattern/library that writes from kafka to Elastic Search? Elaborating on #1—From what I understand. Data lake is mainly used for analytics/AI model training, etc. I have a microservice that wants to query upon the same set of data. Is there a way It can query the da-a from datalake?" In addition, answers can include "ANSWER 1: Thrive can be used to query in batch fashion and SPP can be used for streaming needs. in/streamprocessing" and "ANSWER 2: Event Bus currently has an option to persist events on a topic directly to the Data Lake, see more about it: https://wiki.com/display/Event+Bus+S3+Writer."

At block 202, the server 106 feeds each obtained post as an input to the LLM module 114. In some embodiments, the obtained posts can be fed as an input to the LLM module 114 with a prompt. An example prompt or an "instruction" can be as follows: "The following 'passage' was extracted from stack overflow, where QUESTION is the question asked by a user and multiple ANSWER is given by various users. Create a list of significant questions that can be answered from the 'passage.' Each question should be comprehensive and should have sufficient details for the reader. Add an answer from the 'passage' to each question. Use only the data available in the 'passage.' List each question in the output as 'Q' and answer as 'A.'"

At block 203, the LLM module 114 generates related QnA pairs based on the input post and the prompt. For example, examples QnA pairs that the LLM module 114 can generate for the above post can be 1) "Q: What is SPP and how can it be used for streaming needs?; A: SPP can be used for streaming needs;" 2)) "Q: What is Thrive?; A: Thrive can be used to query in batch fashion;" and 3)) "Q: Is there an option to persist events on a topic directly to the Data Lake?; A: Yes, Event Bus currently has an option to persist events on a topic directly to the Data Lake."

At block 204, the embedding module 116 embeds the original QnA post and the QnA pairs generated by the LLM module 114 to a vector space. The embedded data can then be stored and maintained in the vector database 118 such that is accessible by the vector search module 122. In some embodiments, the embedding procedures can be performed via various embedding techniques, such as those discussed above that include word2vec, skip-gram approaches, GloVe (Global Vector) or FastText. However, these examples are not limiting and any vector embedding technique known to those skilled in the art could be employed.

At block 205, the QnA module 108 receives a user query from the user device 102. For example, a user operating the user device 102 could be communicating with the QnA module 108 via a chatbot platform or interface 124. The user can enter a query via a UI 124, which is transmitted over the network 104 and received by the QnA module 108. At block 206, the embedding module 116 embeds the received user query (e.g., via any of the embedding techniques discussed above). At block 207, the vector search module 122 performs a vector search within the vector database 118 using the embedded user query. As discussed above, the vector search module 122 can use a combination of cosine similarity and machine learning-based ranking within the vector store. In addition, the vector search module 122 can use various other vector search techniques, such as Euclidean distance, Manhattan distance, and Jaccard similarity. The vector search module 122 can also use various machine learning algorithms, such as support vector machines, random forests, and neural networks, to rank the vectors in the vector store.

Because the vector database 118 includes both QnA posts scraped from various online external sources and QnA pairs generated via the LLM module 114, the potential answer space within the vector database 118 is denser and richer.

At block 208, the result (i.e., the answer to the original user query) is transmitted back to and displayed on the user device 102, for example in the chatbot interface on UI 124.

Table 1 below illustrates statistics comparing vector search analysis for question and answering platforms using underlying vector datasets comprising: 1) only posts scraped from online platforms (Set A); 2) only QnA pairs generated via an LLM (Set B); and 3) both posts scraped from online platforms and QnA pairs generated via an LLM (Set A+B).

TABLE 1

|  | Correct | Incorrect |
| --- | --- | --- |
| Set A | 6868 (78.37)% | 1895 (21.63)% |
| Set B | 7876 (89.88)% | 887 (10.12)% |
| Set A + B | 8346 (95.24)% | 417 (4.76)% |

Figure 3:
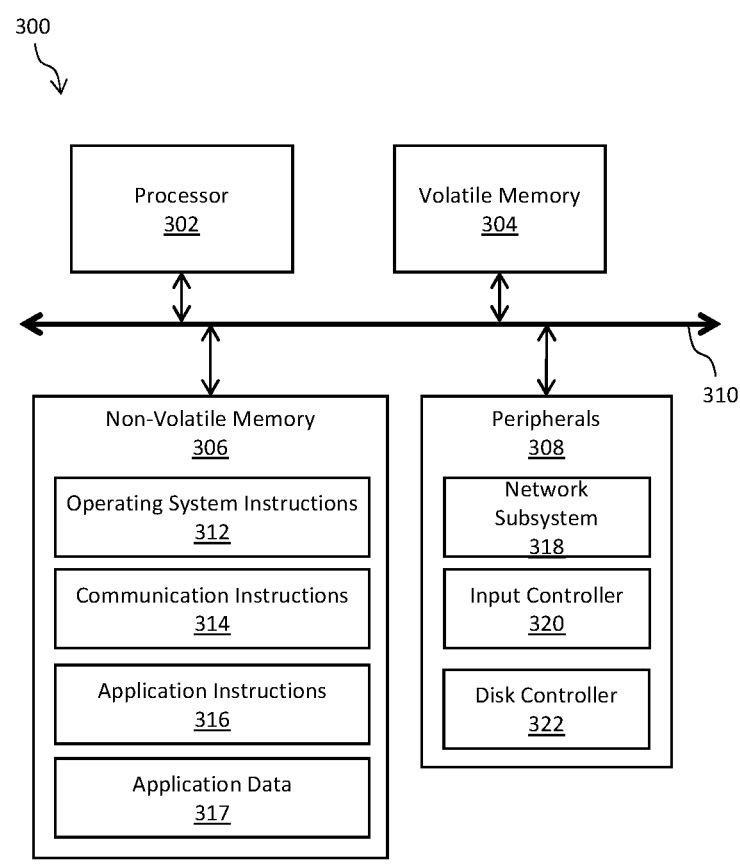
FIG. 3 is an example server device that can be used within the system of FIG. 1 according to an embodiment of the present disclosure.

FIG. 3 is a diagram of an example server device 300 that can be used within system 100 of FIG. 1. Server device 300 can implement various features and processes as described herein. Server device 300 can be implemented on any electronic device that runs software applications derived from complied instructions, including without limitation personal computers, servers, smart phones, media players, electronic tablets, game consoles, email devices, etc. In some implementations, server device 300 can include one or more processors 302, volatile memory 304, non-volatile memory 306, and one or more peripherals 308. These components can be interconnected by one or more computer buses 310.

Processor(s) 302 can use any known processor technology, including but not limited to graphics processors and multi-core processors. Suitable processors for the execution of a program of instructions can include, by way of example, both general and special purpose microprocessors, and the sole processor or one of multiple processors or cores, of any kind of computer. Bus 310 can be any known internal or external bus technology, including but not limited to ISA, EISA, PCI, PCI Express, USB, Serial ATA, or FireWire.

Volatile memory 304 can include, for example, SDRAM. Processor 302 can receive instructions and data from a read-only memory or a random access memory or both. Essential elements of a computer can include a processor for executing instructions and one or more memories for storing instructions and data.

Non-volatile memory 306 can include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 306 can store various computer instructions including operating system instructions 312, communication instructions 314, application instructions 316, and application data 317. Operating system instructions 312 can include instructions for implementing an operating system (e.g., Mac OS®, Windows®, or Linux). The operating system can be multi-user, multiprocessing, multitasking, multithreading, real-time, and the like. Communication instructions 314 can include network communications instructions, for example, software for implementing communication protocols, such as TCP/IP, HTTP, Ethernet, telephony, etc. Application instructions 316 can include instructions for various applications. Application data 317 can include data corresponding to the applications.

Peripherals 308 can be included within server device 300 or operatively coupled to communicate with server device 300. Peripherals 308 can include, for example, network subsystem 318, input controller 320, and disk controller 322. Network subsystem 318 can include, for example, an Ethernet of WiFi adapter. Input controller 320 can be any known input device technology, including but not limited to a keyboard (including a virtual keyboard), mouse, track ball, and touch-sensitive pad or display. Disk controller 322 can include one or more mass storage devices for storing data files; such devices include magnetic disks, such as internal hard disks and removable disks; magneto-optical disks; and optical disks.

Figure 4:
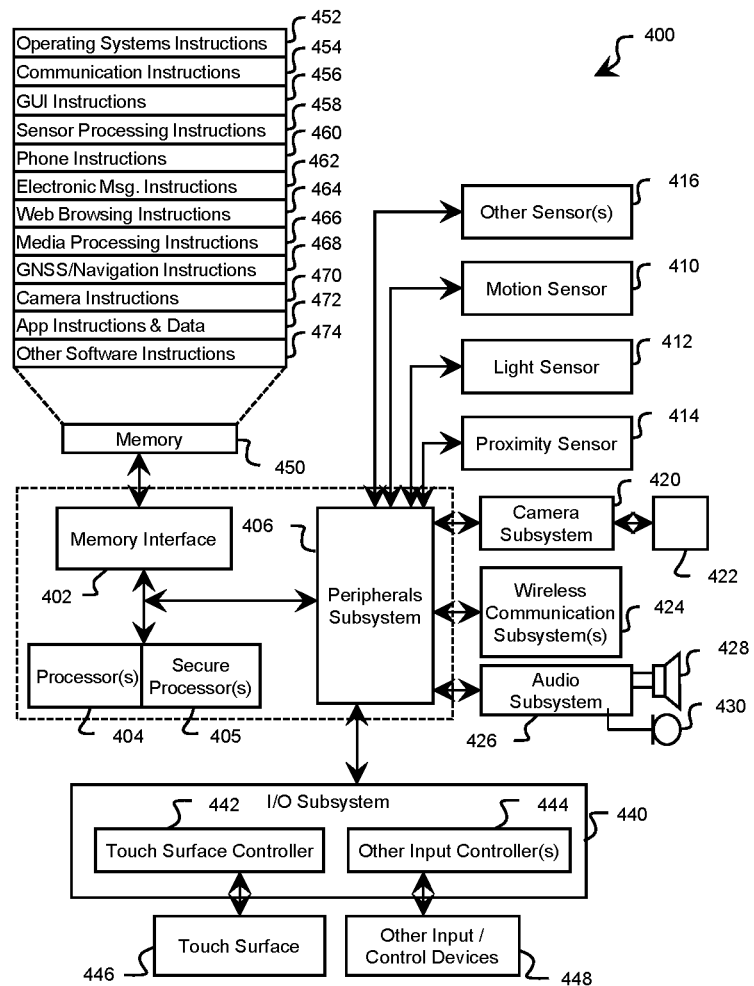
FIG. 4 is an example computing device that can be used within the system of FIG. 1 according to an embodiment of the present disclosure.

FIG. 4 is an example computing device that can be used within the system 100 of FIG. 1, according to an embodiment of the present disclosure. In some embodiments, device 400 can be user device 102. The illustrative user device 400 can include a memory interface 402, one or more data processors, image processors, central processing units 404, and or secure processing units 405, and peripherals subsystem 406. Memory interface 402, one or more central processing units 404 and or secure processing units 405, and or peripherals subsystem 406 can be separate components or can be integrated in one or more integrated circuits. The various components in user device 400 can be coupled by one or more communication buses or signal lines.

Sensors, devices, and subsystems can be coupled to peripherals subsystem 406 to facilitate multiple functionalities. For example, motion sensor 410, light sensor 412, and proximity sensor 414 can be coupled to peripherals subsystem 406 to facilitate orientation, lighting, and proximity functions. Other sensors 416 can also be connected to peripherals subsystem 406, such as a global navigation satellite system (GNSS) (e.g., GPS receiver), a temperature sensor, a biometric sensor, magnetometer, or other sensing device, to facilitate related functionalities.

Camera subsystem 420 and optical sensor 422, e.g., a charged coupled device (CCD) or a complementary metal-oxide semiconductor (CMOS) optical sensor, can be utilized to facilitate camera functions, such as recording photographs and video clips. Camera subsystem 420 and optical sensor 422 can be used to collect images of a user to be used during authentication of a user, e.g., by performing facial recognition analysis.

Communication functions can be facilitated through one or more wired and or wireless communication subsystems 424, which can include radio frequency receivers and transmitters and or optical (e.g., infrared) receivers and transmitters. For example, the Bluetooth (e.g., Bluetooth low energy (BTLE)) and or WiFi communications described herein can be handled by wireless communication subsystems 424. The specific design and implementation of communication subsystems 424 can depend on the communication network(s) over which the user device 400 is intended to operate. For example, user device 400 can include communication subsystems 424 designed to operate over a GSM network, a GPRS network, an EDGE network, a WiFi or WiMax network, and a Bluetooth™ network. For example, wireless communication subsystems 424 can include hosting protocols such that device 400 can be configured as a base station for other wireless devices and or to provide a WiFi service.

Audio subsystem 426 can be coupled to speaker 428 and microphone 430 to facilitate voice-enabled functions, such as speaker recognition, voice replication, digital recording, and telephony functions. Audio subsystem 426 can be configured to facilitate processing voice commands, voice-printing, and voice authentication, for example.

I/O subsystem 440 can include a touch-surface controller 442 and or other input controller(s) 444. Touch-surface controller 442 can be coupled to a touch-surface 446. Touch-surface 446 and touch-surface controller 442 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch-surface 446.

The other input controller(s) 444 can be coupled to other input/control devices 448, such as one or more buttons, rocker switches, thumb-wheel, infrared port, USB port, and or a pointer device such as a stylus. The one or more buttons (not shown) can include an up/down button for volume control of speaker 428 and or microphone 430.

In some implementations, a pressing of the button for a first duration can disengage a lock of touch-surface 446; and a pressing of the button for a second duration that is longer than the first duration can turn power to user device 400 on or off. Pressing the button for a third duration can activate a voice control, or voice command, module that enables the user to speak commands into microphone 430 to cause the device to execute the spoken command. The user can customize a functionality of one or more of the buttons. Touch-surface 446 can, for example, also be used to implement virtual or soft buttons and or a keyboard.

In some implementations, user device 400 can present recorded audio and or video files, such as MP3, AAC, and MPEG files. In some implementations, user device 400 can include the functionality of an MP3 player, such as an iPod™. User device 400 can, therefore, include a 36-pin connector and or 8-pin connector that is compatible with the iPod. Other input/output and control devices can also be used.

Memory interface 402 can be coupled to memory 450. Memory 450 can include high-speed random access memory and or non-volatile memory, such as one or more magnetic disk storage devices, one or more optical storage devices, and or flash memory (e.g., NAND, NOR). Memory 450 can store an operating system 452, such as Darwin, RTXC, LINUX, UNIX, OS X, Windows, or an embedded operating system such as VxWorks.

Operating system 452 can include instructions for handling basic system services and for performing hardware dependent tasks. In some implementations, operating system 452 can be a kernel (e.g., UNIX kernel). In some implementations, operating system 452 can include instructions for performing voice authentication.

Memory 450 can also store communication instructions 454 to facilitate communicating with one or more additional devices, one or more computers and or one or more servers. Memory 450 can include graphical user interface instructions 456 to facilitate graphic user interface processing; sensor processing instructions 458 to facilitate sensor-related processing and functions; phone instructions 460 to facilitate phone-related processes and functions; electronic messaging instructions 462 to facilitate electronic messaging-related process and functions; web browsing instructions 464 to facilitate web browsing-related processes and functions; media processing instructions 466 to facilitate media processing-related functions and processes; GNSS/Navigation instructions 468 to facilitate GNSS and navigation-related processes and instructions; and or camera instructions 470 to facilitate camera-related processes and functions.

Memory 450 can store application (or "app") instructions and data 472, such as instructions for the apps described above in the context of FIGS. 1-4. Memory 450 can also store other software instructions 474 for various other software applications in place on device 400. The described features can be implemented in one or more computer programs that can be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

The described features can be implemented in one or more computer programs that can be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions can include, by way of example, both general and special purpose microprocessors, and the sole processor or one of multiple processors or cores, of any kind of computer. Generally, a processor can receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s)

how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A computing system comprising:
   a processor; and
   a non-transitory computer-readable storage device storing computer-executable instructions, the instructions operable to cause the processor to perform operations comprising:
   obtaining a plurality of question and answer (QnA) posts provided by at least one user on a social media QnA platform;
   feeding at least one of the obtained QnA posts as an input to a generative large language model (LLM);
   generating a plurality of QnA pairs via the generative LLM by analyzing the at least one of the obtained QnA posts;
   embedding the plurality of QnA posts and the generated plurality of QnA pairs to a vector space;
   receiving a query from a user device;
   embedding the query to the vector space;
   executing a vector search of the embedded user query on the embedded plurality of QnA posts and the generated plurality of QnA pairs to determine a response to the user query; and
   transmitting the response to the user device.

2. The computing system of claim 1, wherein obtaining the plurality of QnA posts comprises scraping the plurality of QnA posts from a QnA platform.

3. The computing system of claim 2, wherein scraping the plurality of QnA posts from the QnA platform comprises scraping the plurality of QnA posts from at least one of Stack Overflow, GitHub, Quora, Reddit®, or Yahoo® Answers.

4. The computing system of claim 1, wherein obtaining the plurality of QnA posts comprises filtering out QnA posts that contain greater than a predefined character limit.

5. The computing system of claim 1, wherein feeding the at least one of the obtained posts to the generative LLM comprises feeding the at least one of the obtained posts to the generative LLM with a prompt.

6. The computing system of claim 5, wherein feeding the prompt to the generative LLM comprises feeding one or more instructions and the obtained post to the generative LLM.

7. The computing system of claim 1, wherein embedding the plurality of QnA posts, the generated plurality of QnA pairs, and the received user query to the vector space comprises embedding using at least one of a word2vec, skip-gram approaches, GloVe (Global Vector) or FastText technique.

8. The computing system of claim 1, wherein executing the vector search of the embedded user query on the embedded plurality of QnA posts and the generated plurality of QnA pairs comprises at least one of a combination of cosine similarity and machine learning-based ranking, Euclidean distance, Manhattan distance, Jaccard similarity, a support vector machine, a random forest, or a neural network.

9. The computing system of claim 1, wherein receiving the user query comprises:
   monitoring a chatbot comprising communications between the user device and server; and
   extracting the query from the chatbot.

10. The computing system of claim 1, wherein the operations comprise maintaining the embedded plurality of QnA posts and the generated plurality of QnA pairs in a vector store.

11. A computer-implemented method, performed by at least one processor, comprising:
    obtaining a plurality of question and answer (QnA) provided by at least one user on a social media QnA platform;
    feeding at least one of the obtained QnA posts as an input to a generative large language model (LLM);
    generating a plurality of QnA pairs via the LLM by analyzing the at least one of the obtained QnA posts;
    embedding the plurality of QnA posts and the generated plurality of QnA pairs to a vector space;
    receiving a query from a user device;
    embedding the query to the vector space;
    executing a vector search of the embedded user query on the embedded plurality of QnA posts and the generated plurality of QnA pairs to determine a response to the user query; and
    transmitting the response to the user device.

12. The computer-implemented method of claim 11, wherein obtaining the plurality of QnA posts comprises scraping the plurality of QnA posts from a QnA platform.

13. The computer-implemented method of claim 11, wherein obtaining the plurality of QnA posts comprises filtering out QnA posts that contain greater than a predefined character limit.

14. The computer-implemented method of claim 11, wherein feeding the at least one of the obtained posts to the generative LLM comprises feeding the at least one of the obtained posts to the generative LLM with a prompt.

15. The computer-implemented method of claim 14, wherein feeding the prompt to the generative LLM comprises feeding one or more instructions and the obtained post the generative LLM.

16. The computer-implemented method of claim 11, wherein embedding the plurality of QnA posts, the generated plurality of QnA pairs, and the received user query to the vector space comprises embedding using at least one of a word2vec, skip-gram approaches, GloVe (Global Vector) or FastText technique.

17. The computer-implemented method of claim 11, wherein executing the vector search of the embedded user query on the embedded plurality of QnA posts and the generated plurality of QnA pairs comprises at least one of a combination of cosine similarity and machine learning-based ranking, Euclidean distance, Manhattan distance, Jaccard similarity, a support vector machine, a random forest, or a neural network.

18. The computer-implemented method of claim 11, wherein receiving the user query comprises:
- monitoring a chatbot comprising communications between the user device and server; and
- extracting the query from the chatbot.

19. The computer-implemented method of claim 11, comprising maintaining the embedded plurality of QnA posts and the generated plurality of QnA pairs in a vector store.

20. A computing system comprising:
- a processor;
- a vector store comprising a plurality of embedded question and answer (QnA) posts provided by at least one user on a social media QnA platform and a plurality of embedded QnA pairs generated via being fed as an input to a generative large language model (LLM) and the generative LLM analyzing the QnA posts;
- a non-transitory computer-readable storage device storing computer-executable instructions, the instructions operable to cause the processor to perform operations comprising:
  - receiving a query from a user device;
  - embedding the query to a vector space;
  - executing a vector search of the embedded user query on the vector store to determine a response to the user query; and
  - transmitting the response to the user device for display.

* * * * *